US007070104B2

(12) United States Patent  (10) Patent No.: US 7,070,104 B2
Schenck et al.  (45) Date of Patent: Jul. 4, 2006

(54) SCANNABLE ARTICLE HAVING A SIGNATURE SECTION WITH ALIGNMENT BARS

(75) Inventors: Karen E. Schenck, Woodbridge, VA (US); Charles E. Bravo, Fairfax, VA (US)

(73) Assignee: The United States Postal Services, Washington, DC (US)

( * ) Notice: Subject to any disclaimer, the term of this patent is extended or adjusted under 35 U.S.C. 154(b) by 0 days.

(21) Appl. No.: 10/953,279

(22) Filed: Sep. 30, 2004

(65) Prior Publication Data

US 2005/0247799 A1  Nov. 10, 2005

Related U.S. Application Data

(60) Provisional application No. 60/568,240, filed on May 6, 2004.

(51) Int. Cl.
 *G06K 7/10*  (2006.01)
 *G06K 19/06*  (2006.01)
(52) U.S. Cl. .............. 235/462.01; 235/462.2; 235/470; 235/494; 283/37; 283/81
(58) Field of Classification Search ............ 235/462.2, 235/462.21, 494; 283/37, 74, 75
 See application file for complete search history.

(56) References Cited

U.S. PATENT DOCUMENTS

| | | | | |
|---|---|---|---|---|
| 4,818,856 A | * | 4/1989 | Matsushima et al. | ....... 235/454 |
| 4,980,544 A | * | 12/1990 | Winter | ................... 235/462.01 |
| 5,138,140 A | * | 8/1992 | Siemiatkowski et al. | ... 235/470 |
| 5,153,928 A | * | 10/1992 | Iizuka | ........................ 382/321 |
| 5,534,684 A | * | 7/1996 | Danielson | .............. 235/472.02 |
| 5,656,803 A | * | 8/1997 | Seo | ........................ 235/472.01 |
| 5,959,286 A | * | 9/1999 | Dvorkis et al. | ............. 235/470 |
| 5,992,753 A | | 11/1999 | Xu | |
| 6,070,805 A | * | 6/2000 | Kaufman et al. | ........... 235/494 |
| 6,298,176 B1 | | 10/2001 | Longacre, Jr. et al. | |
| 6,561,428 B1 | | 5/2003 | Meier et al. | |
| 6,877,664 B1 | * | 4/2005 | Oliva | .................... 235/462.42 |
| 2002/0140714 A1 | * | 10/2002 | Hoffman | ..................... 345/700 |

OTHER PUBLICATIONS

PCT search report for international application PCT/US04/31955, Nov. 2, 2005
Written Opinion of the International Searching Authority, Nov. 2, 2005..

* cited by examiner

*Primary Examiner*—Jared J. Fureman
(74) *Attorney, Agent, or Firm*—Finnegan, Henderson, Farabow, Garrett & Dunner, LLP

(57) ABSTRACT

An article scannable by a data capture device has an informational surface and a signature section disposed on the informational surface. The signature section has a signature area and at least two alignment bars A first alignment bar is disposed at a first end of the signature section relative to writing direction. A second alignment bar is disposed at the end of the signature section opposite the first end. The first and second alignment bars are within the signature section.

32 Claims, 2 Drawing Sheets

US 7,070,104 B2

SCANNABLE ARTICLE HAVING A SIGNATURE SECTION WITH ALIGNMENT BARS

RELATED APPLICATIONS

This application claims the benefit of U.S. Provisional Patent Application No. 60/568,240, entitled "Scannable Article Having A Signature Section With Alignment Bars," which was filed on May 6, 2004, the disclosure of which is hereby expressly incorporated herein by reference.

FIELD OF THE INVENTION

This invention relates generally to a scannable article having a signature section, and more particularly, to a scannable article having a signature section with alignment bars.

BACKGROUND OF THE INVENTION

The United States Postal Service (USPS) is an independent government agency that provides mail delivery and other services to the public. The USPS is widely recognized as a safe and reliable means for sending and receiving mail and other items. With the advent and steady growth of electronic mail and electronic commerce, the physical mail stream will increasingly be utilized for sending and receiving packages and other items. In an effort to ensure that mail is delivered not only to the right address, but also into the right hands, the USPS offers tracking of the mailed item in conjunction with many special service options.

Tracking of a mailed item may provide routing information allowing an item to be sent from point A to point B. Tracking may also provide information such as, for example, where the item came from, who prepared the item, when the item was prepared, or where the item is in the item delivery system. Tracking is typically accomplished by affixing a scannable label (e.g., a barcode) to the mailed item and scanning the label at specific checkpoints along a delivery route. The final checkpoint in the route may be the point of delivery, when the mail carrier scans the mailed item just prior to delivery of the mailed item to the recipient.

The special service options may include services such as, for example, delivery confirmation, signature confirmation, certified mail, registered mail, and others. These special service options may provide an added level of security by requiring a signature from the person who accepts the delivery. The signature may be co-located on an adhesive label with the tracking information described above.

During the final step of the tracking process described above, the recipient's signature and the tracking information of the mailed item, may both be scanned. Unfortunately, scanning of a signature can be difficult. In particular, depending on the character of the signature and its orientation, alignment and resolution of the scanned signature may be problematic.

It is accordingly a primary object of this invention to provide a method and apparatus that improves alignment and resolution of a scanned signature.

SUMMARY OF THE INVENTION

In one aspect, the present disclosure is directed to an article scannable by a data capture device that has an informational surface and a signature section disposed on the informational surface. The signature section has a signature area and at least two alignment bars including a first alignment bar disposed on a first end of the signature section relative to writing direction and a second alignment bar disposed at the end of the signature section opposite the first end, the alignment bars being within the signature section.

In another aspect, the present disclosure is directed to a method of reducing misalignment and poor resolution of a scanned signature on an article. The method includes providing an article having an informational surface. The method also includes providing a signature section on the informational surface, the signature section having a signature area. The method further includes providing at least two alignment bars proximal the signature area including a first alignment bar disposed on a first end of the signature section relative to writing direction and a second alignment bar disposed at the end of the signature section opposite the first end.

Additional objects and advantages of the invention will be set forth in part in the description, which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying figures, which are incorporated in and constitute a part of this specification, illustrate embodiments of the invention and together with the description, serve to explain the principles of the invention.

DESCRIPTION OF THE EMBODIMENTS

Detailed Description

Figure 1:
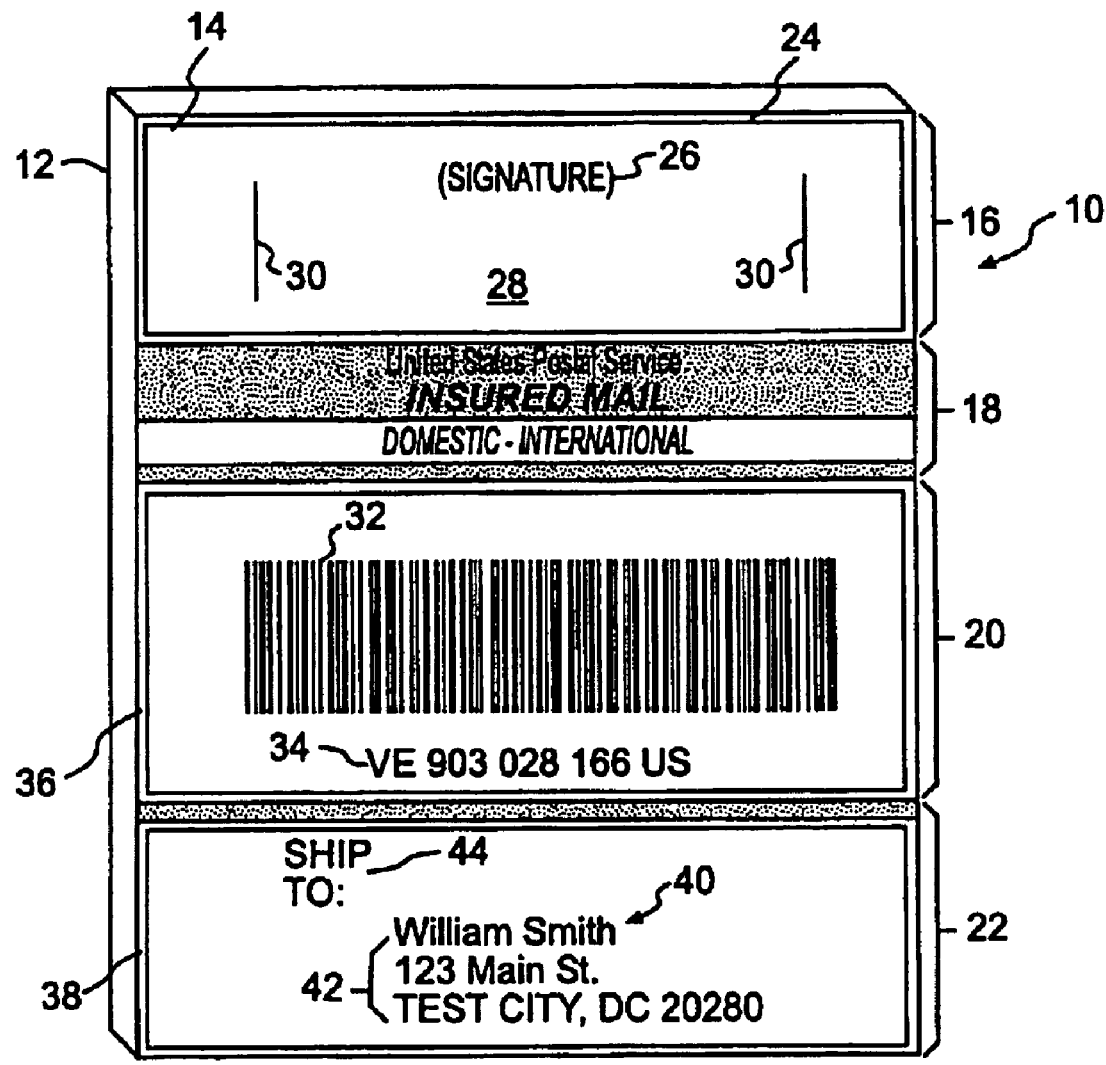
FIG. 1 is a schematic illustration of an adhesive label according to an exemplary embodiment of the present invention and FIG. 2 is a flow chart depicting a method of reducing misalignment and poor resolution of a scanned signature on an article, also an exemplary embodiment of the present invention.
Figure 2:
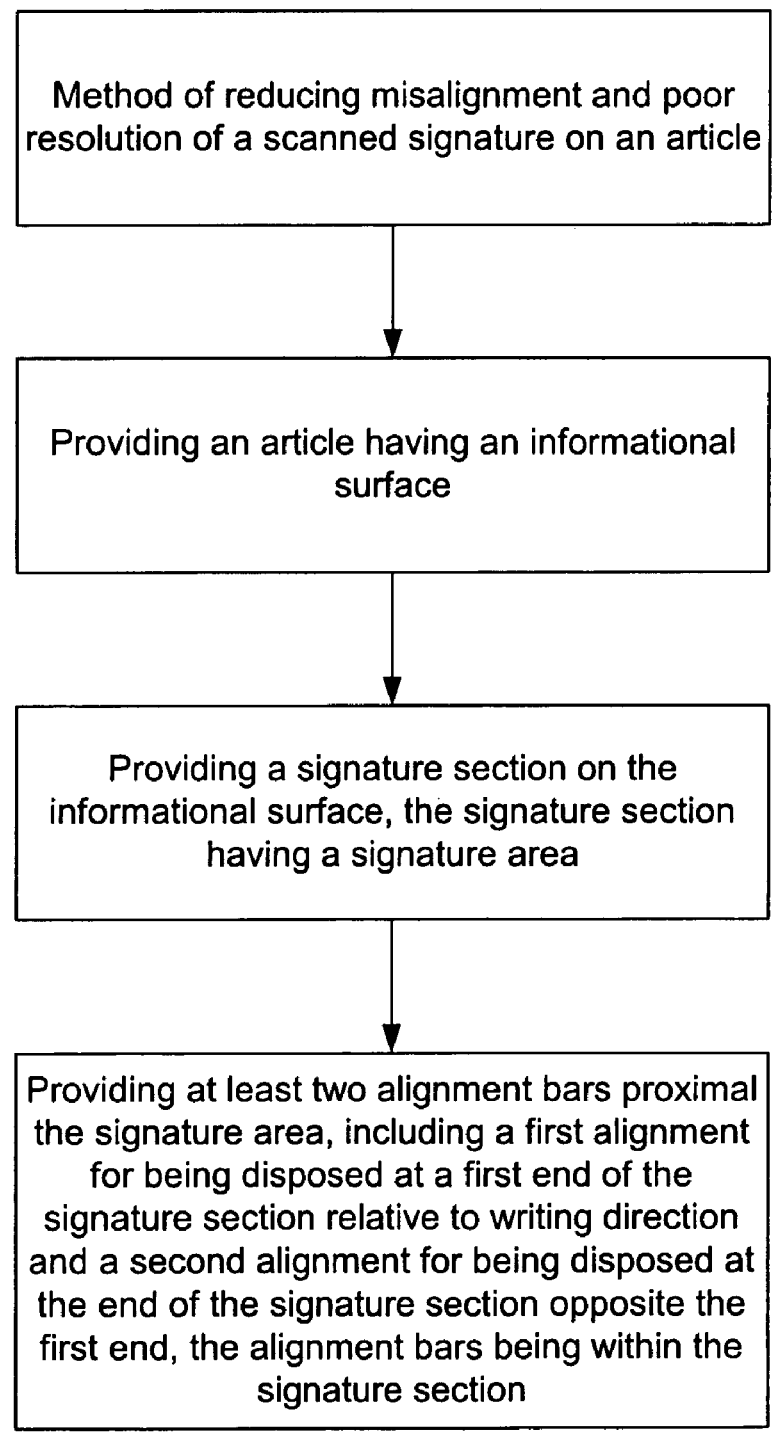

Reference will now be made in detail to the present exemplary embodiments of the invention, an example of which is illustrated in FIG. 1. Wherever possible, the same reference numbers will be used throughout the drawing to refer to the same or like parts.

FIG. 1 illustrates an exemplary embodiment of a scannable article 10. The scannable article 10 may include any form article such as, for example, an adhesive label, a mailing label, or any other suitable article known in the art. Scannable article 10 may include an adhesive surface 12 and an informational surface 14 disposed on the front side of scannable article 10 opposite adhesive surface 12. Informational surface 14 may include a signature section 16, a special service descriptor section 18, a barcode section 20, and an address section 22.

Signature section 16 may include a substantially blank space located on the upper portion of informational surface 14 relative to the remaining sections and extending horizontally from a first side edge of scannable article 10 to a second side edge opposite the first. It is also contemplated that signature section 16 may extend only a portion of the distance from the first side edge to the second side edge, that signature section 16 may be vertically disposed on informational surface 14 relative to the remaining sections, and that signature section 16 may be left justified, centered, or right justified. Signature section 16 may include a border 24 surrounding signature section 16. It is also contemplated that border 24 may also be absent, if desired.

Signature section 16 may include an instructional phrase 26 indicating the correct location of a recipient's signature within a signature area 28. For example, instructional phrase 26 may include a phrase such as "SIGNATURE," "SIGN HERE," or another suitable phrase. It is also contemplated that instructional phrase 26 may be absent, if desired.

Signature section 16 may also include multiple alignment bars 30, including a first alignment bar disposed on a first end of the signature section relative to writing direction (here horizontal) and a second alignment bar disposed at the end of the signature section opposite the first end, the alignment bars being within signature section 16. Alignment bars 30 may be vertical bars having a predetermined width and height. It is contemplated that a greater or lesser number of alignment bars may be included and that the alignment bars may alternately be horizontally oriented, diagonally oriented, or oriented in any other suitable manner relative to the writing direction within signature area 28.

Special service descriptor section 18 may be located below signature section 16 and may describe the type of service purchased by a sender of a mailed item. The services available for purchase may include, for example, delivery confirmation, insured mail, certified mail, registered mail, and others known in the art.

Special service descriptor section 18 may extend horizontally from the first side edge of scannable article 10 to the second side edge. It is also contemplated that special service descriptor section 18 may extend only a portion of the distance from the first side edge to the second side edge, that special service descriptor section 18 may be vertically disposed on information surface 14 relative to the remaining sections, and that special service descriptor section 18 may be left justified, centered, or right justified. Special service descriptor section 18 may include a dark background and/or a border surrounding special service descriptor section 18. It is also contemplated that special service descriptor section 18 may be absent, if desired, and the type of special service purchased by the sender of a mailed item included in data contained within barcode section 20.

Barcode section 20 may be located below special service descriptor section 18 and may extend horizontally from the first side edge of scannable article 10 to the second side edge. It is also contemplated that barcode section 20 may extend only a portion of the distance from the first side edge to the second side edge, that barcode section 20 may be vertically disposed on information surface 14 relative to the remaining sections, and that barcode section 20 may be left justified, centered, or right justified. Barcode section 20 may include a border 36 comprising a left side, a right side, an upper portion, and a lower portion. It is also contemplated that border 36 may be absent.

Barcode section 20 may include a barcode 32, and a 17-digit alphanumeric code 34. Barcode 32 may be centrally located within barcode section 20 and scannable with a data collection device (not shown). Barcode 32 may be a one dimensional or a two dimensional barcode linked to multiple pieces of information such as, for example, a sender's name, a sender's address, a special service purchased, a recipient's name, a recipient's address, a mailing facility, a mailing date, a mailing time, a weight of item to be mailed, a tracking status, and other pieces of information known in the art. Alphanumeric code 34 may be related to barcode 32 and intended for human visual recognition. It is also contemplated that Alphanumeric code 34 may include a greater or lesser number of digits and may be linked to the same or related pieces of information as barcode 32. It is also contemplated that alphanumeric code 34 may be linked to different pieces of information than those linked with barcode 32. It is further contemplated that alphanumeric code 34 may be absent, if desired, and only barcode 32 included within barcode section 20.

Address section 22 may be disposed on the lower portion of informational surface 14 relative to the remaining sections and may extend horizontally from the first side edge of scannable article 10 to the second side edge. It is also contemplated that address section 22 may not extend entirely from the first side edge to the second side edge, that address section 22 may be vertically disposed on information surface 14 relative to the remaining sections, and that address section 22 may be left justified, centered, or right justified. Address section 22 may include a border 38 surrounding address section 22. It is also contemplated that border 38 may be absent, if desired.

Address section 22 may include a name 40, an address 42, and an instructional phrase 44 designating the person listed under name 40 as the recipient of the mailed item. For example, instructional phrase 44 may include the phrase "SHIP TO," "RECIPIENT," or any other suitable phrase. It is also contemplated that instructional phrase 44 may be absent.

INDUSTRIAL APPLICABILITY

The disclosed signature section, having alignment bars 30, may be applicable to any scannable article such as, for example, an adhesive label, a mailing label, or any other suitable form article requiring scanning. Alignment bars 30 may reduce alignment and resolution problems associated with detecting, reading, or storing a handwritten signature in at least two ways.

The first way to reduce the alignment and resolution problems may be by comparing a general physical location of a data capture device relative to the alignment bars. For example, whether the data capture device is handheld or automatically positioned, alignment bars 30 may provide an initial target for placement of the data capture device. If handheld, an operator of the data capture device can substantially align the data capture device within the signature area by visually comparing a distance between an outer structure of the data capture device and alignment bars 30 or by visually comparing an angle between an outer structure of the data capture device and alignment bars 30. If the distance or the angle difference is greater than a predetermined value, the data capture device may be repositioned by moving the data capture device in a direction of decreasing difference. Similarly, a structure of the data capture device may be automatically compared to a position and/or orientation of alignment bars 30 for initial placement of the data capture device prior to scanning.

The second way to reduce alignment and resolution problems may be to calibrate a position and/or orientation of the data capture device relative to alignment bars 30. Once positioned within the signature area of the form article, the data capture device may be configured to perform calibration processes based on an error value being greater than a predetermine value. The error value may be generated by comparing a captured dimension of alignment bars 30 with one or more predetermined calibration values. The captured dimension may include, for example, a distance between alignment bars 30, length of one or both alignment bars 30, a thickness, a shade, an orientation of alignment bars 30, and/or an angle between alignment bars 30. The error values determined through the calibration processes may then be used to either change scan settings of the data capture device or require re-positioning of the data capture device prior to scanning signature section 16. The calibration process may also be used to offset, skew, or otherwise modify already scanned images.

Other embodiments of the disclosed scannable article 10 will be apparent to those skilled in the art from consideration of the specification and practice of the invention disclosed herein. For example, the entire scannable article 10 may be scanned and electronically stored. Further, a greater of lesser number of sections may be included on scannable article 10 and the sections may be in a different order. Scannable article 10 may also have a different shape than that in the present disclosure. Alignment bars 30 may also be included in sections other than the signature section. It is intended that the specification and examples be considered as exemplary only, with a true scope and spirit of the invention being defined by the following claims.

What is claimed is:

1. An article scannable by a date capture device, comprising:
    an informational surface;
    a signature area disposed on the informational surface, the signature section having a signature area; and
    at least two alignment bars, a first alignment bar being disposed at a first end of the signature section relative to writing direction and a second alignment bar being disposed at a second end of the signature section opposite the first end, the alignment bars being within the signature section.

2. The article of claim 1, wherein the at least two alignment bars have a predetermined dimension corresponding to a predetermined calibration dimension of the data capture device.

3. The article of claim 2, wherein the predetermined dimension includes the a distance between the at least two alignment bars.

4. The article of claim 2, wherein the predetermined dimension includes an angle between the at least two alignment bars.

5. The article of claim 2, wherein the predetermined dimension includes a thickness of at least one of the at least two alignment bars.

6. The article of claim 2, wherein the predetermined dimension includes a length of at least one of the at least two alignment bars.

7. The article of claim 1, wherein the article is a mailing label.

8. The article of claim 7, further including an address section disposed on the informational surface.

9. The article of claim 7, further including a service descriptor section disposed on the informational surface, the service descriptor section being indicative of a purchased mailing service.

10. The article of claim 1, further including a barcode section disposed on the informational surface.

11. The article of claim 10, wherein the barcode section and the signature section are both scannable with a single data collection device.

12. The article of claim 1, wherein the signature section includes an instructional phrase.

13. The article of claim 1, further including an adhesive surface opposite the informational surface.

14. An adhesive label scannable by a data capture device, comprising:
    an informational surface;
    an adhesive layer opposite the informational surface;
    a signature section disposed on the informational surface, the signature section having a signature area; and
    two alignment bars including a first alignment bar being disposed at a first end of the signature section relative to writing direction and a second alignment bar being disposed at a second end of the signature section opposite the first end, the alignment bars being within the signature section, wherein the two alignment bars have a dimension corresponding to a predetermined calibration dimension of the data capture device.

15. A method of reducing misalignment and poor resolution of a scanned signature on an article, the method comprising:
    providing an article having an informational surface;
    providing a signature section on the informational surface, the signature section having a signature area; and
    providing at least two alignment bars proximal the signature area, including a first alignment bar being disposed at a first end of the signature section relative to writing direction and a second alignment bar disposed at a second end of the signature section opposite the first end, the alignment bars being within the section.

16. The method of claim 15, further including positioning a data capture device over the signature section.

17. The method of claim 15, wherein positioning includes:
    visually comparing a location of the data capture device relative to the at least two alignment bars; and
    moving the data capture device in response to the data capture device being outside of a predetermined location relative to the at least two alignment bars.

18. The method of claim 15, wherein positioning includes:
    scanning the at least two alignment bars with the data capture device, the data capture device configured to compare a scanned dimension of the at least two alignment bars relative to a portion of the data capture device to create an error value; and
    moving the data capture device in a direction of decreasing error value when the error value is greater than a predetermined value.

19. The method of claim 18, wherein the dimension is a distance between a portion of the data capture device and the at least two alignment bars.

20. The method of claim 18, wherein the dimension is an angle between a portion of the data capture device and the at least two alignment bars.

21. The method of claim 15, further including:
    scanning the signature section to capture a scanned image of the at least two alignment bars;
    measuring a dimension of the at least alignment bars;
    comparing the dimension with a predetermined calibration value to determine an error value;
    changing a setting of the data capture device in response to the error value; and
    canning the signature section with the data capture device after changing the settings to capture a scanned image of a signature within the signature section.

22. The method of claim 21, wherein the dimension includes a width of at least one of the at least two alignment bars.

23. The method of claim 21, wherein the dimension includes a length of at least one of the at least two alignment bars.

24. The method of claim 21, wherein the dimension includes a distance between the at least two alignment bars.

25. The method of claim 15, further including:
   scanning the signature section to create a scanned image of the signature area and the at least two alignment bars;
   measuring a dimension of the at least two alignment bars;
   comparing the dimension with a predetermined calibration value to determine an error value; and
   modifying the scanned image of the signature area in response to the error value.

26. The method of claim 25, wherein the dimension includes a width of at least one of the at least two alignment bars.

27. The method of claim 25, wherein the dimension includes a length of at least one of the at least two alignment bars.

28. The method of claim 25, wherein the dimension includes a distance between the at least two alignment bars.

29. The method of claim 15, wherein the informational surface further includes a barcode section having at least one of a one dimensional barcode and a two dimensional barcode.

30. The method of claim 15, wherein the signature section includes an instructional phrase.

31. The method of claim 15, wherein the article is a mailing label having an address section.

32. The method of claim 31, wherein the informational surface further includes a service descriptor section indicative of a purchased mailing service.

* * * * *

UNITED STATES PATENT AND TRADEMARK OFFICE
CERTIFICATE OF CORRECTION

| | |
|---|---|
| PATENT NO. | : 7,070,104 B2 |
| APPLICATION NO. | : 10/953279 |
| DATED | : July 4, 2006 |
| INVENTOR(S) | : Karen E. Schenck and Charles E. Bravo |

It is certified that error appears in the above-identified patent and that said Letters Patent is hereby corrected as shown below:

In claim 3, column 5, line 42, "includes the a distance" should read --includes a distance--.

In claim 21, column 6, line 65, "canning" should read --scanning--.

Signed and Sealed this

Twenty-first Day of November, 2006

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,070,104 B2 |
| APPLICATION NO. | : 10/953279 |
| DATED | : July 4, 2006 |
| INVENTOR(S) | : Karen E. Schenck and Charles E. Bravo |

Page 1 of 1

It is certified that error appears in the above-identified patent and that said Letters Patent is hereby corrected as shown below:

In claim 1, column 5, line 26, "date" should read --data--

In claim 17, column 6, line 32, "15" should read --16--

In claim 18, column 6, line 39, "15" should read --16--

Signed and Sealed this

Ninth Day of February, 2010

David J. Kappos
*Director of the United States Patent and Trademark Office*